UNITED STATES PATENT OFFICE.

RUDOLF MÜLLER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

HYDROSULFITE PREPARATION.

No. 839,500.     Specification of Letters Patent.     Patented Dec. 25, 1906.

Application filed December 20, 1905. Serial No. 292,630.

*To all whom it may concern:*

Be it known that I, RUDOLF MÜLLER, Ph. D., chemist, a citizen of the Empire of Germany, residing at Höchst-on-the-Main, Germany, have invented certain new and useful Improvements in the Manufacture of Hydrosulfite Preparations, of which the following is a specification.

I have found that a stable hydrosulfite preparation may be obtained suitable for vat-dyeing by treating alkali hydrosulfites with ammonia and ketones, like dimethylketone and ethylmethylketone, and by evaporating the mixture to dryness in a vacuum.

I proceed, for instance, as follows: To one liter of a solution of sodium hydrosulfite containing about twelve per cent. of sodium hydrosulfite $Na_2S_2O_4$ are added one hundred grams of acetone and two hundred cubic centimeters of ammonia of twenty-five per cent. strength, the mixture being evaporated to dryness in a vaccuum at low temperature. The preparation thus obtained is a white powder readily soluble in water of feebly-alkaline reaction. Its solution when heated has the odor of ammonia and acetone and decolorizes indigo sulfonic acid at ordinary temperature. Its reducing power diminishes only slowly by the influence of the air.

The product obtained by this process is no homogeneous compound and cannot be expressed by a formula. The product is characterized by its decomposing into ammonia, acetone, and hydrosulfite when heated in solution.

Having now described my invention, what I claim is—

1. The process herein described for the manufacture of hydrosulfite preparations, which consists in bringing together alkali hydrosulfites, ketones and ammonia and in drying the mixture in a vacuum at low temperature.

2. A new hydrosulfite obtained by evaporating a solution of alkali hydrosulfite in the presence of dimethylketone and ammonia, being a white powder readily soluble in water, the solution of which, when heated, has the odor of acetone and ammonia and which reduces indigo sulfonic acid at ordinary temperature.

In testimony that I claim the foregoing as my invention I have signed my name in presence of two subscribing witnesses.

RUDOLF MÜLLER.

Witnesses:
   JEAN GRUND,
   CARL GRUND.